(12) United States Patent
Dubagunta

(10) Patent No.: US 7,797,688 B1
(45) Date of Patent: Sep. 14, 2010

(54) INTEGRATING APPLICATIONS IN MULTIPLE LANGUAGES

(76) Inventor: Saikumar V. Dubagunta, 8232 Fountain Ridge Dr., Plano, TX (US) 75025

( * ) Notice: Subject to any disclaimer, the term of this patent is extended or adjusted under 35 U.S.C. 154(b) by 873 days.

(21) Appl. No.: 11/086,101

(22) Filed: Mar. 22, 2005

(51) Int. Cl.
G06F 9/45 (2006.01)
(52) U.S. Cl. .................................. 717/136
(58) Field of Classification Search .............. 717/136
See application file for complete search history.

(56) References Cited

U.S. PATENT DOCUMENTS

| | | |
|---|---|---|
| 4,714,995 A | 12/1987 | Materna et al. |
| 5,524,253 A | 6/1996 | Pham et al. |
| 5,721,912 A | 2/1998 | Stepczyk et al. |
| 5,778,395 A | 7/1998 | Whiting et al. |
| 5,812,997 A | 9/1998 | Morimoto et al. |
| 5,859,911 A | 1/1999 | Angelo et al. |
| 5,930,798 A | 7/1999 | Lawler et al. |
| 5,982,891 A | 11/1999 | Ginter et al. |
| 6,038,500 A | 3/2000 | Weiss |
| 6,113,650 A | 9/2000 | Sakai |
| 6,154,777 A | 11/2000 | Ebrahim |
| 6,172,986 B1 | 1/2001 | Watanuki et al. |
| 6,199,195 B1 | 3/2001 | Goodwin et al. |
| 6,209,124 B1 | 3/2001 | Vermeire et al. |
| 6,230,309 B1 | 5/2001 | Turner et al. |
| 6,256,773 B1 | 7/2001 | Bowman-Amuah |
| 6,272,478 B1 | 8/2001 | Obata et al. |
| 6,282,563 B1 | 8/2001 | Yamamoto et al. |
| 6,282,697 B1 | 8/2001 | Fables et al. |
| 6,304,556 B1 | 10/2001 | Haas |
| 6,330,677 B1 | 12/2001 | Madoukh |
| 6,343,265 B1 | 1/2002 | Glebov et al. |
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,452,910 B1 | 9/2002 | Vij et al. |
| 6,477,372 B1 | 11/2002 | Otting et al. |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |

(Continued)

FOREIGN PATENT DOCUMENTS

JP 2005190103 7/2005

OTHER PUBLICATIONS

Emmerich, et al., "TIGRA—An Architectural Style for Enterprise Application Integration", *IEEE*, (Jul. 2001),p. 567-576.

(Continued)

*Primary Examiner*—Wei Y Zhen
*Assistant Examiner*—Junchun Wu

(57) ABSTRACT

A method, system, and computer readable medium for integrating applications in multiple languages comprises receiving properties related to an application in an original language, importing source files related to the application, receiving classes related to the source files, mapping data types related to the classes, receiving properties related to an application in a target language, and generating integration classes related to the data types.

44 Claims, 2 Drawing Sheets

U.S. PATENT DOCUMENTS

| | | | |
|---|---|---|---|
| 6,687,761 B1 | 2/2004 | Collins et al. | |
| 6,701,381 B2 | 3/2004 | Hearne et al. | |
| 6,714,844 B1 | 3/2004 | Dauner et al. | |
| 6,738,975 B1 | 5/2004 | Yee et al. | |
| 6,744,352 B2 | 6/2004 | Lesesky et al. | |
| 6,744,358 B1 | 6/2004 | Bollinger | |
| 6,744,820 B1 | 6/2004 | Khairallah et al. | |
| 6,768,417 B2 | 7/2004 | Kuragaki et al. | |
| 6,816,452 B1 | 11/2004 | Maehata | |
| 6,831,375 B1 | 12/2004 | Currie et al. | |
| 6,851,108 B1 | 2/2005 | Syme | |
| 6,862,443 B2 | 3/2005 | Witte | |
| 6,876,845 B1 | 4/2005 | Tabata et al. | |
| 6,901,588 B1 | 5/2005 | Krapf et al. | |
| 6,904,593 B1 | 6/2005 | Fong et al. | |
| 6,931,455 B1 | 8/2005 | Glass | |
| 6,931,623 B2 | 8/2005 | Vermeire et al. | |
| 6,947,965 B2 | 9/2005 | Glass | |
| 6,951,021 B1 | 9/2005 | Bodwell et al. | |
| 6,957,439 B1 | 10/2005 | Lewallen | |
| 6,963,582 B1 | 11/2005 | Xu | |
| 6,981,150 B2 | 12/2005 | Little et al. | |
| 6,985,929 B1 | 1/2006 | Wilson et al. | |
| 6,993,774 B1 | 1/2006 | Glass | |
| 7,047,518 B2 | 5/2006 | Little et al. | |
| 7,058,645 B2 * | 6/2006 | Seto et al. | 707/101 |
| 7,062,708 B2 * | 6/2006 | Mani et al. | 715/239 |
| 7,069,551 B2 | 6/2006 | Fong et al. | |
| 7,127,259 B2 | 10/2006 | Ueda et al. | |
| 7,127,724 B2 | 10/2006 | Lewallen | |
| 7,146,614 B1 | 12/2006 | Nikols et al. | |
| 7,172,113 B2 | 2/2007 | Olenick et al. | |
| 7,174,533 B2 | 2/2007 | Boucher | |
| 7,197,742 B2 | 3/2007 | Arita et al. | |
| 7,210,132 B2 | 4/2007 | Rivard et al. | |
| 7,213,227 B2 | 5/2007 | Kompalli et al. | |
| 7,225,425 B2 | 5/2007 | Kompalli et al. | |
| 7,228,141 B2 | 6/2007 | Sethi | |
| 7,231,403 B1 | 6/2007 | Howitt et al. | |
| 7,237,225 B2 | 6/2007 | Kompalli et al. | |
| 7,293,261 B1 | 11/2007 | Anderson et al. | |
| 7,477,897 B2 | 1/2009 | Bye | |
| 7,496,637 B2 | 2/2009 | Han et al. | |
| 7,499,990 B1 | 3/2009 | Tai et al. | |
| 7,502,615 B2 | 3/2009 | Wilhoite et al. | |
| 7,506,309 B2 | 3/2009 | Schaefer | |
| 7,519,455 B2 | 4/2009 | Weiss et al. | |
| 7,566,002 B2 | 7/2009 | Love et al. | |
| 7,643,447 B2 | 1/2010 | Watanuki et al. | |
| 7,660,777 B1 | 2/2010 | Hauser | |
| 7,660,780 B1 | 2/2010 | Patoskie | |
| 7,664,721 B1 | 2/2010 | Hauser | |
| 7,698,243 B1 | 4/2010 | Hauser | |
| 7,702,602 B1 | 4/2010 | Hauser | |
| 7,702,603 B1 | 4/2010 | Hauser | |
| 7,702,604 B1 | 4/2010 | Hauser | |
| 2001/0029526 A1 | 10/2001 | Yokoyama et al. | |
| 2001/0051515 A1 | 12/2001 | Rygaard | |
| 2001/0056425 A1 | 12/2001 | Richard | |
| 2002/0032783 A1 | 3/2002 | Tuatini | |
| 2002/0035429 A1 | 3/2002 | Banas | |
| 2002/0091680 A1 | 7/2002 | Hatzis et al. | |
| 2002/0115445 A1 | 8/2002 | Myllymaki | |
| 2002/0159479 A1 | 10/2002 | Watanuki et al. | |
| 2002/0196771 A1 | 12/2002 | Vij et al. | |
| 2003/0009539 A1 | 1/2003 | Hattori | |
| 2003/0018950 A1 | 1/2003 | Sparks et al. | |
| 2003/0023573 A1 | 1/2003 | Chan et al. | |
| 2003/0033437 A1 | 2/2003 | Fischer et al. | |
| 2003/0046377 A1 | 3/2003 | Daum et al. | |
| 2003/0070071 A1 | 4/2003 | Riedel et al. | |
| 2003/0101441 A1 | 5/2003 | Harrison et al. | |
| 2003/0177170 A1 * | 9/2003 | Glass | 709/203 |
| 2003/0191969 A1 | 10/2003 | Katsikas | |
| 2003/0225789 A1 | 12/2003 | Bussler et al. | |
| 2003/0225935 A1 | 12/2003 | Rivard et al. | |
| 2004/0003243 A1 | 1/2004 | Fehr et al. | |
| 2004/0044985 A1 | 3/2004 | Kompalli et al. | |
| 2004/0044986 A1 | 3/2004 | Kompalli et al. | |
| 2004/0044987 A1 | 3/2004 | Kompalli et al. | |
| 2004/0064503 A1 | 4/2004 | Karakashian et al. | |
| 2004/0078423 A1 * | 4/2004 | Satyavolu et al. | 709/203 |
| 2004/0078687 A1 | 4/2004 | Partamian et al. | |
| 2004/0082350 A1 | 4/2004 | Chen et al. | |
| 2004/0111730 A1 | 6/2004 | Apte | |
| 2004/0148073 A1 | 7/2004 | Hawig et al. | |
| 2004/0172614 A1 | 9/2004 | Gallagher | |
| 2004/0194072 A1 | 9/2004 | Venter | |
| 2004/0203731 A1 | 10/2004 | Chen et al. | |
| 2004/0220952 A1 | 11/2004 | Cheenath | |
| 2004/0221292 A1 * | 11/2004 | Chiang et al. | 719/310 |
| 2005/0004727 A1 | 1/2005 | Remboski et al. | |
| 2005/0030202 A1 | 2/2005 | Tsuboi | |
| 2005/0090279 A9 | 4/2005 | Witkowski et al. | |
| 2005/0114832 A1 | 5/2005 | Manu | |
| 2005/0141706 A1 | 6/2005 | Regli et al. | |
| 2005/0172123 A1 | 8/2005 | Carpentier et al. | |
| 2005/0246302 A1 | 11/2005 | Lorenz et al. | |
| 2005/0256614 A1 | 11/2005 | Habermas | |
| 2005/0256876 A1 | 11/2005 | Eidson | |
| 2005/0262155 A1 | 11/2005 | Kress et al. | |
| 2005/0281363 A1 | 12/2005 | Qi et al. | |
| 2006/0005177 A1 * | 1/2006 | Atkin et al. | 717/151 |
| 2006/0031850 A1 | 2/2006 | Falter et al. | |
| 2006/0041337 A1 | 2/2006 | Augsburger et al. | |
| 2006/0048145 A1 | 3/2006 | Celli et al. | |
| 2006/0080646 A1 | 4/2006 | Aman | |
| 2006/0090103 A1 | 4/2006 | Armstrong et al. | |
| 2006/0111089 A1 | 5/2006 | Winter et al. | |
| 2006/0112183 A1 | 5/2006 | Corson et al. | |
| 2006/0121916 A1 | 6/2006 | Aborn | |
| 2006/0123396 A1 | 6/2006 | Fox et al. | |
| 2006/0143600 A1 | 6/2006 | Cottrell et al. | |
| 2006/0149746 A1 | 7/2006 | Bansod et al. | |
| 2006/0167981 A1 * | 7/2006 | Bansod et al. | 709/203 |
| 2006/0173857 A1 | 8/2006 | Jackson | |
| 2006/0190931 A1 | 8/2006 | Scott et al. | |
| 2006/0200494 A1 | 9/2006 | Sparks | |
| 2006/0206864 A1 * | 9/2006 | Shenfield et al. | 717/107 |
| 2006/0220900 A1 | 10/2006 | Ceskutti et al. | |
| 2006/0221901 A1 | 10/2006 | Yaqub et al. | |
| 2006/0245406 A1 | 11/2006 | Shim | |
| 2006/0256008 A1 | 11/2006 | Rosenberg | |
| 2006/0272002 A1 | 11/2006 | Wightman et al. | |
| 2007/0004432 A1 | 1/2007 | Hwang et al. | |
| 2007/0015495 A1 | 1/2007 | Winter et al. | |
| 2007/0026871 A1 | 2/2007 | Wager | |
| 2007/0103292 A1 | 5/2007 | Burkley et al. | |
| 2007/0112773 A1 | 5/2007 | Joyce | |
| 2007/0223432 A1 | 9/2007 | Badarinath | |
| 2007/0243880 A1 | 10/2007 | Gits et al. | |
| 2008/0077667 A1 | 3/2008 | Hwang et al. | |

OTHER PUBLICATIONS

Bussler, Christoph "The Role of B2B Engines in B2B Integration Architectures", *ACM*, (Mar. 2002),67-72.

Jandl, et al., "Enterprise Application Integration by means of a generic CORBA LDAP Gateway", *ACM*, (May 2002),711.

Sutherland, et al., "Enterprise Application Integration and Complex Adaptive Systems", *ACM*, (Oct. 2002),59-64.

Ballance, et al., "The Pan Language-Based Editing System For Integrated Development Environments", *ACM*, (Oct. 1990),77-93.

Dilts, et al., "An Inteligent Interface to CIM Multiple Data Bases", *ACM, TALIP*, (Mar. 2004), vol. 3 Issue 1, pp. 491-509.

"Advisory Action", U.S. Appl. No. 11/086,121, (Sep. 11, 2009), 3 pages.

"Final Office Action", U.S. Appl. No. 10/975,146, (Dec. 1, 2009), 11 pages.

"Final Office Action", U.S. Appl. No. 10/975,827, (Nov. 23, 2009), 17 pages.

"Non Final Office Action", U.S. Appl. No. 10/975,623, (Nov. 12, 2009), 17 pages.

Blackwell, John "Ramit - Rule-Based Alert Management Information Tool", *Thesis, Florida State University College of Arts and Science*, (2004), pp. 1-69.

Lockemann, Peter C., "Agents and Databases: Friends or Foes?", *Proceedings of the 9th International Database Engineering & Application Symposium(IDEAS '05)*, (2005), 11 pages.

"Notice of Allowance", U.S. Appl. No. 11/645,190, (Sep. 17, 2009), 8 pages.

"Notice of Allowance", U.S. Appl. No. 11/645,193, (Sep. 17, 2009), 8 pages.

"Final Office Action", U.S. Appl. No. 11/086,211, (Sep. 29, 2009), 18 pages.

Praet, et al., "Processor Modeling and Code Selection for Retargetable Compilation", Jul. 2001, *ACM, TODAES* vol. 6, Issue 3, pp. 277-307.

"Notice of Allowance", U.S. Appl. No. 11/645,291, (Oct. 11, 2009), 11 pages.

"Final Office Action", U.S. Appl. No. 11/052,680, (Oct. 5, 2009), 16 pages.

"Final Office Action", U.S. Appl. No. 11/086,102, (Oct. 20, 2009), 13 pages.

Forte, "Feature Comparison of Agent and Free Agent", *Retrieved from*: <vvww.forteinc.com/agent/features.php> on Jan. 26, 2010, (2002), 3 pages.

Russell, Stuart et al., "Artificial Intelligence: A Modern Approach", *Pearson*, (2003), pp. 5, 32-56, 449-454.

Stallings, William "ISDN and Broadband ISDN with Frame Relay and ATM", *Prentice-Hall*, (1999), p. 516.

"Final Office Action", U.S. Appl. No. 11/086,120, (Feb. 23, 2010), 43 pages.

"Final Office Action", U.S. Appl. No. 11/495,053, (Mar. 17, 2010), 17 pages.

"Non Final Office Action", U.S. Appl. No. 10/975,827, (Mar. 25, 2010), 19 pages.

"Non Final Office Action", U.S. Appl. No. 11/439,059, (Mar. 26, 2010), 6 pages.

"Non Final Office Action", U.S. Appl. No. 11/645,194, (Mar. 26, 2010), 26 pages.

"Non Final Office Action", U.S. Appl. No. 11/645,198, (Apr. 12, 2010), 14 pages.

"Non-Final Office Action", U.S. Appl. No. 11/052,680, (Feb. 4, 2010), 12 pages.

"Non-Final Office Action", U.S. Appl. No. 11/086,102, (Mar. 5, 2010), 15 pages.

"Non-Final Office Action", U.S. Appl. No. 11/645,195, (Apr. 15, 2010), 20 pages.

"Non-Final Office Action", U.S. Appl. No. 11/645,197, (Feb. 24, 2010), 13 pages.

"Non-Final Office Action", U.S. Appl. No. 11/645,301, (Jan. 6, 2010), 25 pages.

"Non-Final Office Action", U.S. Appl. No. 11/645,303, (Feb. 8, 2010), 18 pages.

"Notice of Allowance", U.S. Appl. No. 10/975,623, (Feb. 23, 2010), 9 pages.

"Restriction Requirement", U.S. Appl. No. 11/645,191, (Jan. 28, 2010), 7 pages.

"Restriction Requirement", U.S. Appl. No. 11/645,192, (Jan. 28, 2010), 6 pages.

"Restriction Requirement", U.S. Appl. No. 11/645,198, (Jan. 28, 2010), 6 pages.

"Restriction Requirement", U.S. Appl. No. 11/645,200, (Feb. 26, 2010), 8 pages.

Adnan, Syed et al., "A Survey of Mobile Agent Systems", CSE 221, Final Project, Jun. 13, 2000, 12 pages.

Baumann, J. et al., "Mole 3.0: A Middleware for Java-Based Mobile Software Agents", (1998), 18 pages.

Bigus, J.P. et al., "ABLE: A toolkit for building multiagent autonomic systems", IBM Systems Journal, vol. 41, No. 3, 2002, 22 pages.

Bursell, Michael et al., "Comparison of autonomous mobile agent technologies", (May 12, 1997), 28 pages.

Sterritt, Roy et al., "From Here to Autonomicity: Self-Managing Agents and the Biological Metaphors that Inspire Them", (Jun. 2005), 8 pages.

"Non-Final Office Action", U.S. Appl. No. 11/086,121, (Dec. 30, 2009), 25 pages.

"Non-Final Office Action", U.S. Appl. No. 11/439,059, (Oct. 30, 2009), 9 pages.

"Non-Final Office Action", U.S. Appl. No. 11/495,053, (Jun. 10, 2009), 13 pages.

"Notice of Allowance", U.S. Appl. No. 11/645,292, (Nov. 17, 2009), 9 pages.

"Notice of Allowance", U.S. Appl. No. 11/645,300, (Nov. 18, 2009), 9 pages.

"Notice of Allowance", U.S. Appl. No. 11/645,302, (Nov. 17, 2009), 8 pages.

"Notice of Allowance", U.S. Appl. No. 11/645,306, (Nov. 17, 2009), 8 pages.

"Advisory Action", U.S. Appl. No. 11/086,120, (May 4, 2010), 3 pages.

"Final Office Action", U.S. Appl. No. 11/052,680, (May 17, 2010), 12 pages.

"Final Office Action", U.S. Appl. No. 11/645,301, (May 12, 2010), 29 pages.

"Non Final Office Action", U.S. Appl. No. 11/645,191, (May 5, 2010), 15 pages.

"Non Final Office Action", U.S. Appl. No. 11/645,192, (May 4, 2010), 13 pages.

"Non Final Office Action", U.S. Appl. No. 11/645,196, (Apr. 28, 2010), 31 pages.

Brazier, F.M.T. et al., "Generative Migration of Agents", Department of Computer Science, Faculty of Sciences, Vrije Universiteit Amsterdam; de Boelelaan 1081a, 1081 Hv Amsterdam, The Netherlands {frances, bjo, steen, niek} @cs.vu.I,(Aug. 2002), 4 pages.

Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.

Hasegawa, Tetsou et al., "Inoperability for mobile agents by incarnation agents", AAMAS; Melbourne, Australia.,(Jul. 14, 2003), 2 pages.

Jih, Wan-Rong et al., "Context-aware Access Control in Pervasive Healthcare", Computer Science and Information Engineering, National Taiwan University, Taiwan. jih@agents.csie.ntu.edu.tw., {r93070, yjhsu} @csie.ntu.edu.tw,(2005), 8 pages.

Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.

Qui-Sheng, He et al., "A Lightweight Architecture to Support Context-Aware Ubiquitous Agent System", Department of Computer Science and Engineering, Fudan University, Shanghai 200433, Chain {hequisheng, situ} @fudan.edu.cn,(Aug. 2006), 6 pages.

Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk.,(Aug. 2006), 10 pages.

* cited by examiner

INTEGRATING APPLICATIONS IN MULTIPLE LANGUAGES

CROSS-REFERENCE TO RELATED APPLICATIONS

The present application is related to U.S. patent application Ser. No. 11/086,121, entitled SYSTEM, METHOD, AND COMPUTER READABLE MEDIUM FOR INTEGRATING AN ORIGINAL APPLICATION WITH A REMOTE APPLICATION, U.S. patent application Ser. No. 11/086,211, entitled SYSTEM, METHOD, AND COMPUTER READABLE MEDIUM FOR INTEGRATING APPLICATIONS IN MULTIPLE LANGUAGES, U.S. patent application Ser. No. 11/086,120, entitled SYSTEM, METHOD, AND COMPUTER READABLE MEDIUM FOR INTEGRATING AN ORIGINAL LANGUAGE APPLICATION WITH A TARGET LANGUAGE APPLICATION, and U.S. patent application Ser. No. 11/086,102, entitled SYSTEM, METHOD, AND COMPUTER READABLE MEDIUM FOR NORMALIZING SOURCE FILES IN MULTIPLE SOFTWARE LANGUAGES, the disclosures of which are incorporated in their entirety by reference herein.

BACKGROUND OF THE INVENTION

The present invention is related to integrating applications, and, more specifically to a system and method for integrating applications in multiple software languages.

Various limitations are associated with integrating applications such as difficulty in sharing the structure of application data and application programming interfaces (classes). As such, it is cumbersome for an application written in one language to access a functionality provided by an application written in a different language. It is currently tedious to integrate these applications because a common structure must be defined in a third language (such as Extensible Markup Language, Common Object Request Broker Architecture Event Definition Language, etc.).

The present invention overcomes these problems and limitations by providing a system and method for integrating applications in multiple software languages.

SUMMARY OF THE INVENTION

The present invention comprises a system, method, and computer readable medium for integrating applications in multiple software languages. In one embodiment, a method for integrating applications in multiple software languages comprises receiving properties related to an application in an original language, importing source files related to the application, receiving classes related to the source files, mapping data types related to the classes, receiving properties related to an application in a target language, and generating integration classes related to the data types.

In anther embodiment, a method for integrating applications in multiple software languages comprises receiving properties related to an application in an original language, importing source files related to the application, receiving classes related to the source files, mapping data types related to the classes, and generating integration classes related to the data types.

In a further embodiment, a computer readable medium comprises instructions for: importing source files related to an application in an original language, receiving classes related to the source files, mapping data types related to the classes, receiving properties related to an application in a target language, and integrating the original language application and the target language application.

In yet anther embodiment, a system for integrating applications in multiple software languages comprises a source language module comprising an adapter and a target language module adapted to: invoke a method on a proxy class and send a message indicating an intent to invoke the method on the source language module, wherein the adapter receives the message and invokes the method on the source language module.

DETAILED DESCRIPTION OF THE INVENTION

Figure 1:
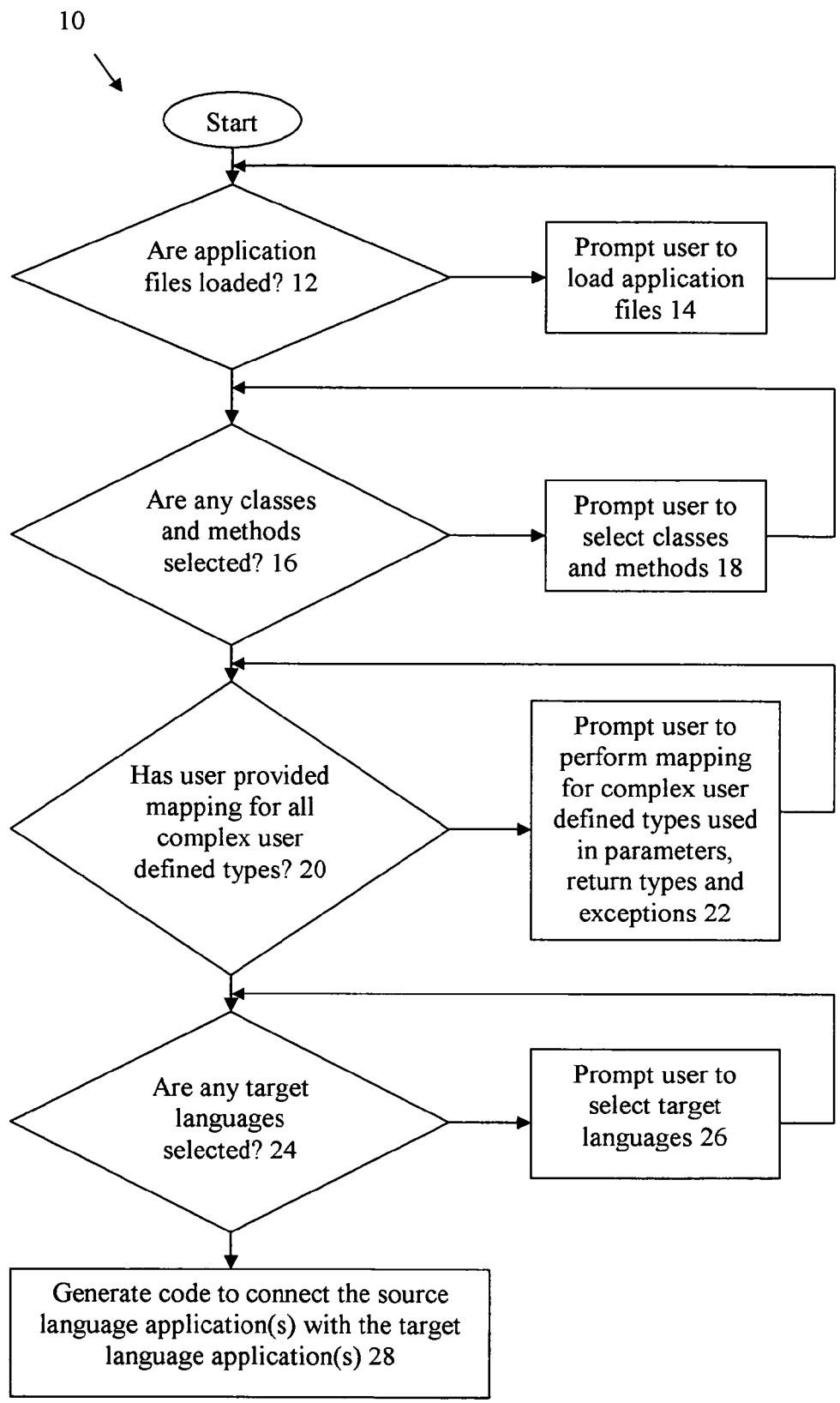
FIG. 1 depicts a flow chart describing connecting a source language application with a target language application in accordance with an embodiment of the present invention.

FIG. 1 depicts a flow chart 10 that describes steps involved in connecting a source language application with a target language application. A software program implementing the current invention is started and at step 12, it is determined if application files are loaded. In one embodiment, it is determined if application files in an original (source) language are loaded into the program. This determination is preferably performed by software of the present invention but can be performed by a user. If the files are not loaded, the software and/or user are prompted to load the application files at step 14. In one embodiment, a prompt to load the original source files into the program is received. The software program normalizes the definitions in the original source files that are loaded. Definitions include classes, methods, structures and other software program constructs. If the files are loaded, it is determined if any classes and methods are selected at step 16. In one embodiment, the software program checks to see if the user has selected any classes and/or methods in the original source files. The selected methods and classes will be exported to target language applications.

If they are not selected, the software and/or user are prompted to select the classes, methods, and other constructs in the program at step 18. If they are selected, it is determined if mapping for all complex user defined types is provided at step 20. In one embodiment, the software program verifies the selected constructs against all target languages. The software program identifies the mapping of the constructs in the original source language to the target language. If the mapping is not provided, the software and/or user are prompted to perform the mapping for all complex user defined types used in parameters, return types, and exceptions in step 22. In one embodiment, if the construct is complex in nature and has no equivalent in a target language, the software program prompts the user to provide a mapping for the construct. If the mapping is provided, it is determined if any target languages are selected at step 24. If they are not selected, the software and/or user are prompted to select the target languages at step 26. If they are selected, software is generated to connect the source language application with the target language application(s) at step 28. The generated code consists of adapters on the source language side to export existing source language application objects. The generated code consists of proxies on the target language side to provide access to source language application objects.

In one embodiment, a method for integrating applications in multiple languages comprises receiving properties related to an application in an original language, importing source files related to the application, receiving classes related to the source files, mapping data types related to the classes, receiving properties related to an application in a target language, and generating integration classes related to the data types, wherein the original language and the target language are at least one of a following language: a different language, a same language, and a related language, and wherein the generating includes integrating the original language application and the target language application. The method further comprises receiving a plurality of properties related to a plurality of applications in a plurality of original languages and target languages, wherein the data types related to the target language are equivalent to the data types related to the original language.

In the method, the importing includes normalizing the at least one language into a common representation, wherein the common representation includes a metadata structure. The method further comprises receiving methods related to the classes, wherein the methods are selected and wherein the classes are selected. The method also comprises providing mapping for fundamental types in the at least one language, wherein the mapping is provided for at least one of a following class: non-complex classes, and complex classes, wherein the mapping for the non-complex classes are provided by default, and wherein the mapping for the complex classes are provided by a user.

In the method, the integration classes includes at least one of a following element: adapter classes related to the original language, proxy classes related to the target language, data types related to the target language, streamers related to the target language, and streamers related to the original language. Also, the data types related to the target language are equivalent to the data types related to the original language.

The present invention also includes a method for integrating applications in multiple software languages, comprising: receiving properties related to an application in an original language, importing source files related to the application, receiving classes related to the source files, mapping data types related to the classes, and generating integration classes related to the data types.

The present invention further includes a computer readable medium that comprises instructions for importing source files related to an application in an original language, receiving classes related to the source files, mapping data types related to the classes, receiving properties related to an application in a target language, and integrating the original language application and the target language application.

Figure 2:
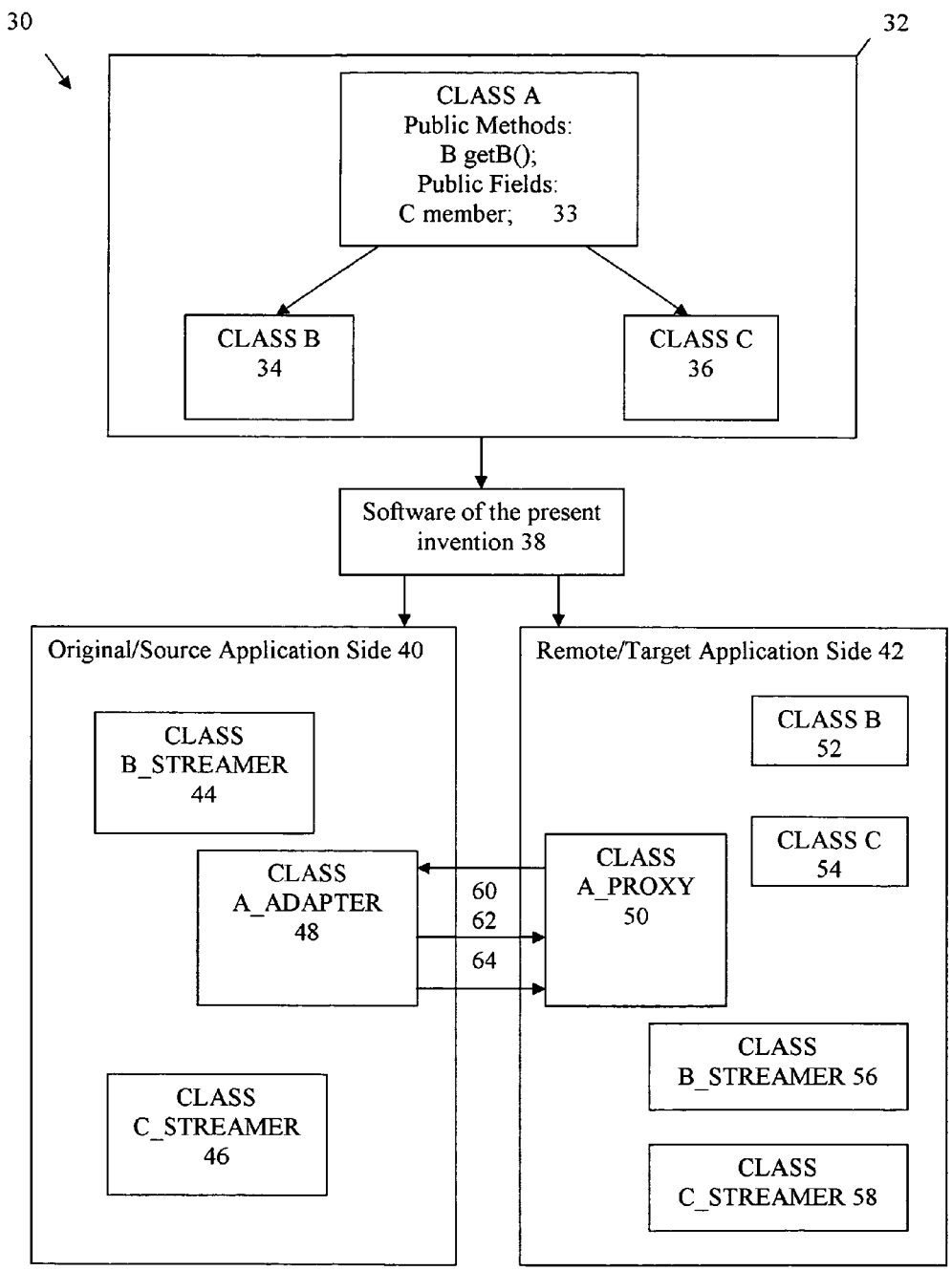
FIG. 2 depicts a flow diagram describing messaging between a source application and a target application in accordance with an embodiment of the present invention.

FIG. 2 depicts a flow diagram 30 of the present invention. An input source file 32 in the original language, that includes a plurality of classes 33-36, is loaded into the software program implementing the current invention. Class 33 (or Class A) is a business class and classes 34 and 36 are data classes used by the business class. More specifically, Class A is an application class that is exported by the user. The application class consists of a method, for example, getB( ) and a member. Class B is a data class that is used as a result type by the method in the application Class A and Class C is a data class that is used as the type of a member in the application Class A. In this example, class 34 is used as a result of a method, class 36 is used as a public member, and class 33 is a class that is of interest to remote applications.

The input file 32 is imported into an application 38 (which is a software program implementing the current invention) that generates files or classes 44-48 on an original or source application side 40 and files or classes 50-58 on a remote or target application side 42. The streamer class 44 is generated for Class B which is used as the return type for the getB( ) method in Class A, while the streamer class generated for Class C is used as the type of the member in Class A. The Adapter class 48 is generated for Class A that provides target language applications to invoke the getB( ) method and access the member of original source application objects. The input file 32, the application 38, the source application side 40 and the target application side 42 may fully and/or partially reside on a client, a server, and/or a client and a server.

A proxy class 50 (related to the target language) sends a request 60 to an adapter class 48 (related to the original language), and a response 62 and an exception 64 are received by the proxy class 50. The request 60, the response 62, and the exception 64 are sent generally based on data types 52 and 54 related to the target language, streamers 56 and 58 related to the target language, and streamers 44 and 46 related to the original language. More specifically, the proxy class 50 is generated for the Class A to be used in the target language applications as a proxy for the original source application objects. The proxy class 50 contains a getB( ) method, an access for a member and a mutator for the member.

The Class B 52, is an equivalent class for Class B 34 in the original source language that forms the return type of the getB( ) method in the proxy, while the Class C 54 is an equivalent class for Class C 36 in the original source language that is used in the accessor and mutator for the member. The streamer classes 56 and 58 are streamer classes generated for the generated Class B and Class C, respectively.

The target language application 42 communicates with the source language application by invoking the getB( ) method on the proxy class. The method invocation causes the generated code to create a data packet 60 containing the intent of the target language application 42 to invoke the getB( ) method on the source language application 40 object. The packet 60 is transferred to the source language application 40. The source language application adapter 48 receives the packet 60 and invokes the method on the original source language application object. The return data of the method is returned as a response packet 62 to the target language application 42. If an exception occurs during the invocation of the method on the original source language application object, the exception data of the method is returned as a exception packet 64 to the target language application 42.

In one embodiment, a system for integrating applications in multiple software languages comprises a source language module comprising an adapter, and a target language module adapted to: invoke a method on a proxy class, and send a message indicating an intent to invoke the method on the source language module, wherein the adapter receives the message and invokes the method on the source language module, wherein the target language module is adapted to receive a response to the message, and wherein, if an exception occurs during the invocation of the method on the source language module, the target language module is adapted to receive an exception message.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the functionality performed by the input file 32, the application 38, the source application side 40 and the target application side 42, can be performed by one or more of the input file 32, the application 38, the source application side 40 and the target application side 42 in a distributed architecture and on or via any electronic device. Further, such functionality may be performed by depicted and/or un-depicted contents of the input file 32, the application 38, the source application side 40 and the target application side 42.

What is claimed is:

1. A method comprising:
   receiving original language constructs related to an original language application written in an original language, the original language constructs including one or more classes associated with the original language application;
   determining whether mappings are provided for mapping the original language constructs to one or more target language constructs related to a target language application written in a target language;
   in response to determining that one or more of the mappings for the original language constructs to the one or more target language constructs are not provided, causing a prompt to be provided to enable the one or more of the mappings for the original language constructs to the one or more target language constructs to be provided; and
   generating integration classes based at least in part on the one or more mappings for the original language constructs to the one or more target language constructs, the integration classes enabling the original language application to be integrated with the target language application, wherein the integration classes include a proxy class associated with the target language application and an adapter class associated with the original language application.

2. A method as recited in claim 1, wherein the original language and the target language are at least one of a following language:
   a different language;
   a same language; or
   a related language.

3. A method as recited in claim 1, wherein the generating comprises integrating the original language application and the target language application.

4. A method as recited in claim 1, further comprising normalizing one or more properties of the original language into a common representation.

5. A method as recited in claim 4, wherein the common representation includes a metadata structure.

6. A method as recited in claim 1, wherein the original language constructs are adapted to be user-selected.

7. A method as recited in claim 1, further comprising mapping fundamental types in the original language.

8. A method as recited in claim 7, wherein the mapping is effective to map one or more user-defined types.

9. A method as recited in claim 8, wherein mapping for the one or more user-defined types is provided by default.

10. A method as recited in claim 8, wherein mapping for the one or more user-defined types is adapted to be user-provided.

11. A method as recited in claim 1, wherein the integration classes include at least one of the following elements:
    data types related to the target language;
    streamers related to the target language; or
    streamers related to the original language.

12. A method as recited in claim 1, wherein the original language constructs include one or more original language data types.

13. A method as recited in claim 1, wherein generating the integration classes further comprises generating one or more proxies associated with the target language, the proxies being configured to request access to one or more objects associated with the original language.

14. A method as recited in claim 13, wherein one or more of the objects associated with the original language comprise an original language method.

15. A method as recited in claim 13, wherein generating the integration classes further comprises generating an adapter associated with the original language, the adapter being configured to receive a request from one or more of the proxies for access to one of the objects, and wherein the one of the objects comprises an original language method.

16. A method as recited in claim 15, wherein the adapter is further configured to invoke the original language method in response to the request from the one or more of the proxies.

17. A method comprising:
    receiving original language constructs related to an original language application, the original language constructs including one or more classes associated with the original language application;
    determining whether mappings are provided for mapping one or more of the original language constructs to one or more target language constructs related to a target language application written in a target language;
    in response to determining that one or more of the mappings for the original language constructs to the one or more target language constructs are not provided, causing a prompt to be presented that enables the one or more mappings to be provided for the original language constructs to one or more target language constructs of the target language application;
    receiving the one or more mappings for the original language constructs to the one or more target language constructs of the target language application;
    generating integration classes related to the one or more mappings for the original language constructs to the one or more target language constructs, the integration classes enabling the original language application to be integrated with the target language application, the integration classes including a proxy class associated with the target language application and an adapter class associated with the original language application;
    receiving at the adapter class a request from the proxy class to invoke a method associated with the original language application; and
    invoking the method based at least in part on the request.

18. A system for integrating applications in multiple software languages, comprising:
    a processor;
    an application executable by the processor, the application being executable to:
    receive a selection of one or more source language constructs associated with a source language;
    determine whether one or more mappings are provided for mapping the one or more source language constructs to one or more target language constructs associated with a target language;
    in response to determining that the one or more mappings for the one or more source language constructs to the one or more target language constructs are not provided, cause a prompt to be presented requesting that the one or more mappings be provided for the one or more source language constructs to the one or more target language constructs associated with the target language; and generate code that is executable by the processor to connect an application in the source language with an application in a target language, the code being based at least in part on the one or more mappings for the one or more source language constructs to the one or more target language constructs, the code comprising:

integration classes comprising a proxy class associated with the application in the target language and an adapter class associated with the application in the source language; and a target language module configured to:

invoke a method on a proxy class associated with the target language module; and send a message to the adapter class indicating an intent to invoke the method on a source language module;

wherein the adapter class is configured to receive the message and invoke the method on the source language module.

19. A system as recited in claim 18, wherein the target language module is adapted to receive a response to the message.

20. A system as recited in claim 18, wherein the target language module is adapted to receive an exception message in response to an exception occurring during the invocation of the method on the source language module.

21. A computer-readable medium having stored thereon computer-executable instructions that, in response to execution by a device, cause the device to perform operations comprising:

receiving original language constructs related to an original language application written in an original language, the original language constructs including one or more classes associated with the original language application;

determining whether mappings are provided for mapping the original language constructs to one or more target language constructs related to a target language application written in a target language;

in response to determining that one or more of the mappings for the original language constructs to the one or more target language constructs are not provided, causing a prompt to be provided to enable the one or more of the mappings to be provided; and generating integration classes based at least in part on the one or more mappings for the original language constructs to the one or more target language constructs, the integration classes enabling the original language application to be integrated with the target language application, wherein the integration classes include a proxy class associated with the target language application and an adapter class associated with the original language application.

22. The computer-readable medium of claim 21, wherein the original language and the target language are at least one of a following language:

a different language;

a same language; or a related language.

23. The computer-readable medium of claim 21, wherein the generating comprises integrating the original language application and the target language application.

24. The computer-readable medium of claim 21, further comprising importing the source files related to the original language application by normalizing one or more properties of the original language into a common representation.

25. The computer-readable medium of claim 24, wherein the common representation includes a metadata structure.

26. The computer-readable medium of claim 21, wherein the computer-executable instructions, in response to execution by the device, enable the original language constructs to be user-selected.

27. The computer-readable medium of claim 21, further comprising mapping fundamental types in the original language.

28. The computer-readable medium of claim 27, wherein the mapping is effective to map one or more user-defined types.

29. The computer-readable medium of claim 28, wherein mapping for the one or more user-defined types is provided by default.

30. The computer-readable medium of claim 28, wherein the computer-executable instructions, in response to execution by the device, enable the mapping for the one or more user-defined types to be user-selected.

31. The computer-readable medium of claim 21, wherein the integration classes include at least one of the following elements:

data types related to the target language;

streamers related to the target language; or streamers related to the original language.

32. The computer-readable medium of claim 31, wherein the data types related to the target language are equivalent to data types related to the original language.

33. An apparatus comprising:

a processor;

a memory, in which instructions are stored comprising an application configured to, in response to execution by the processor, cause the apparatus to:

receive original language constructs related to an original language application written in an original language, the original language constructs including one or more classes associated with the original language application;

determine whether mappings are provided for mapping the original language constructs to one or more target language constructs related to a target language application written in a target language;

in response to determining that one or more of the mappings for the original language constructs to the one or more target language constructs are not provided, cause a prompt to be provided to enable the one or more of the mappings for the original language constructs to the one or more target language constructs to be provided; and generate integration classes based at least in part on the one or more of the mappings for the original language constructs to the one or more target language constructs, the integration classes enabling the original language application to be integrated with the target language application, wherein the integration classes include a proxy class associated with the target language application and an adapter class associated with the original language application.

34. The apparatus of claim 33, wherein the original language and the target language are at least one of a following language:

a different language;

a same language; or a related language.

35. The apparatus of claim 33, wherein the application is further configured to, in response to execution by the processor, cause the apparatus to integrate the original language application and the target language application.

36. The apparatus of claim 33, wherein the application is further configured to, in response to execution by the processor, cause the apparatus to import the source files related to the application in the original language by normalizing one or more properties of the original language into a common representation.

37. The apparatus of claim 36, wherein the common representation includes a metadata structure.

38. The apparatus of claim 33, wherein the application is further configured to, in response to execution by the processor, cause the apparatus to enable the original language constructs to be user-selected.

39. The apparatus of claim 33, wherein the application is further configured to, in response to execution by the processor, cause the apparatus to map fundamental types in the original language.

40. The apparatus of claim 39, wherein the application is further configured to, in response to execution by the processor, cause the apparatus to map one or more user-defined types.

41. The apparatus of claim 40, wherein a mapping for the one or more user-defined types is provided by default.

42. The apparatus of claim 40, wherein the application is further configured to, in response to execution by the processor, cause the apparatus to enable a mapping for the one or more user-defined types to be user-provided.

43. The apparatus of claim 33, wherein the integration classes include at least one of the following elements:
  data types related to the target language;
  streamers related to the target language; or
  streamers related to the original language.

44. The apparatus of claim 43, wherein the data types related to the target language are equivalent to data types related to the original language.

\* \* \* \* \*

UNITED STATES PATENT AND TRADEMARK OFFICE
CERTIFICATE OF CORRECTION

PATENT NO. : 7,797,688 B1
APPLICATION NO. : 11/086101
DATED : September 14, 2010
INVENTOR(S) : Saikumar V. Dubagunta It is certified that error appears in the above-identified patent and that said Letters Patent is hereby corrected as shown below:

In column 7, line 3, in Claim 18, delete "a" and insert --the-- therefor.

Signed and Sealed this

Seventh Day of December, 2010

David J. Kappos
*Director of the United States Patent and Trademark Office*